June 27, 1967     C. C. GAMBILL     3,328,662
LIGHT RESPONSIVE SEMICONDUCTOR SPEED CONTROL
Filed March 11, 1964
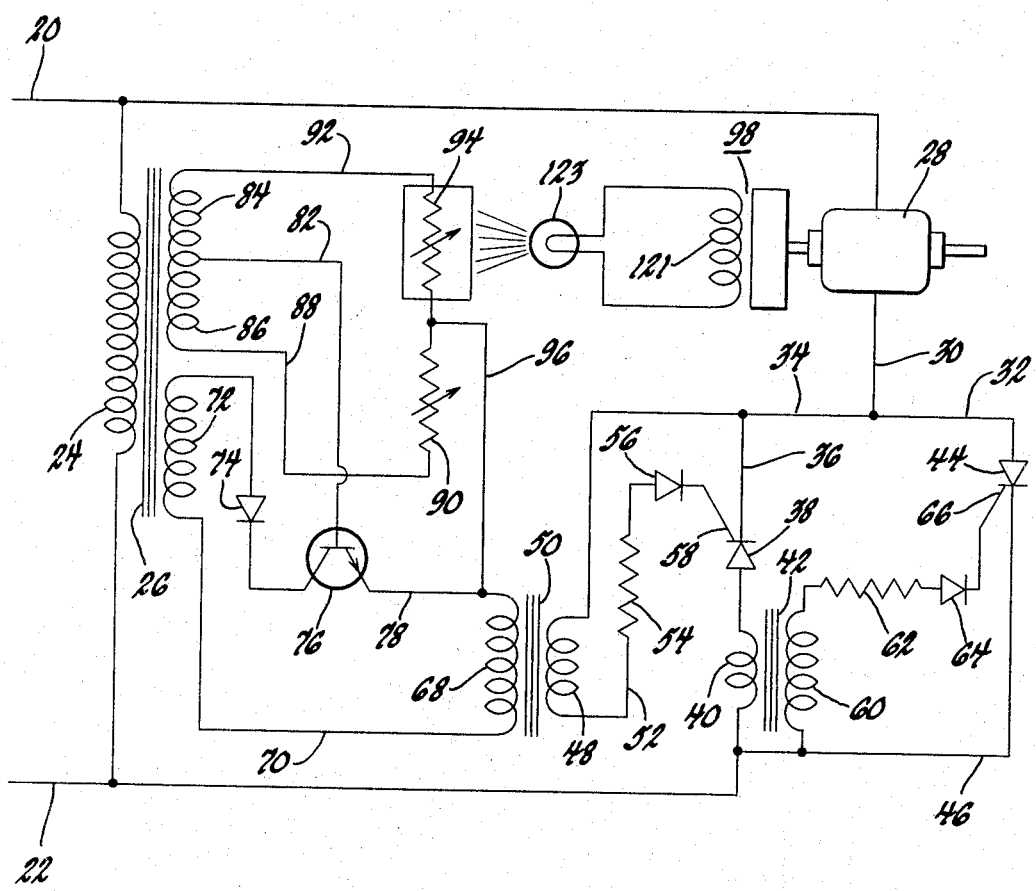
INVENTOR.
Charles C. Gambill
BY
Carl A. Stickel
HIS ATTORNEY

3,328,662
LIGHT RESPONSIVE SEMICONDUCTOR SPEED CONTROL
Charles C. Gambill, Tipp City, Ohio, assignor to General Motors Corporation, Detroit, Mich., a corporation of Delaware
Filed Mar. 11, 1964, Ser. No. 350,963
2 Claims. (Cl. 318—313)

This invention pertains to electrical apparatus and more particularly to means for controlling the speed of an alternating current electric motor.

Devices for controlling the speed of alternating current electric motors have been complicated and expensive. Furthermore, many of these controls have contact difficulties and radio interference.

It is another object of this invention to provide an accurate, relatively inexpensive speed control for alternating current electric motors which will eliminate contact difficulties and radio interference.

It is another object of this invention to provide an accurate relatively inexpensive speed control for alternating current electric motors with employs an efficient inexpensive feedback system for accurate speed control which includes a low current and low voltage output generator for energizing a lamp according to motor speed for varying the resistance of a light dependent resistance.

These and other objects are attained in the form shown in the drawings in which an alternating current electric motor is connected in series with two silicon controlled rectifiers arranged oppositely in parallel circuit with each other and in series with the electric motor. The silicon controlled rectifiers are arranged in a master-slave arrangement with the master rectifier being controlled by voltage supplied from a transformer circuit. This transformer circuit includes a transistor controlled by a transformer powered bridge circuit containing a variable resistance for adjusting the speed of the motor and a light dependent resistance which is associated with an electric lamp which is energized by a generator driven by the electric motor.

Further objects and advantages of the present invention will be apparent from the following description, reference being had to the accompanying drawings wherein a preferred embodiment of the present invention is clearly shown.

In the drawing:

The figure is a wiring diagram illustrating one form of my invention.

Referring now to the figure there are shown the 230 volt alternating current supply conductors 20 and 22 connecting to the input winding 24 of a transformer 26. The conductor 20 also connects with one terminal of an electric motor 28. As one specific example, this motor 28 may be a 230 volt, single phase 2.1 ampere ¼ H.P. 1075 r.p.m. capacitor run induction motor such, as for example, is manufactured by the Delco Products Division, GMC, known by No. C1472.

The second terminal of the motor 28 is connected by the conductor 30 to the branch conductors 32 and 34. The branch conductor 34 connects through the conductor 36 to the cathode of the master silicon controlled rectifier 38 which has its anode connected through the 6-turn winding 40 of the transformer 42 with the second supply conductor 22. The branch conductor 32 connects with the anode of the slave silicon controlled rectifier 44 which has its cathode connected through the conductor 46 with the supply conductor 22. As one specific example, the master silicon controlled rectifier 38, as well as the slave silicon controlled rectifier 44 may be a G.E. C–15D rectifier. The branch conductor 34 connects to one terminal of the 6-volt winding 48 of the transformer 50. This 6-volt winding 48 through the conductor 52, the fixed resistance 54, and the diode 56 applies a peak voltage to the gate 58 at the beginning of every half cycle that the master rectifier 38 can fire.

The transformer 42 is energized during every half cycle that the master rectifier 38 conducts. It energizes the 120 turn 6-volt winding 60 having one terminal connected through the conductor 46 to the cathode of the slave rectifier 44 and has the second terminal connected through the 47 ohm fixed resistance 62 and the rectifier 64 with the gate 66 of the slave rectifier 44. Thus through this arrangement, whenever the master rectifier 38 fires or conducts for one half cycle, the slave rectifier 44 will fire or conduct for the following half cycle. By providing for conduction for complete half cycles, radio interference is avoided.

The amount of energization provided by the winding 48 determines whether sufficient voltage will be applied at the gate 58 to cause the master rectifier 38 to conduct. This is controlled so as to cause the motor 28 to operate at substantially any selected constant operating speed. This is accomplished through the transformer circuit which includes a 9-volt winding 68 forming a part of the transformer 50 connected by a conductor 70 with the 9-volt winding 72 forming one output winding of the transformer 26. The other terminal of the winding 72 is connected through the diode rectifier 74 with the collector of the transistor 76. The emitter of the transistor 76 is connected by the conductor 78 to the input winding 68 of the transformer 50. The transistor 76 controls the current flow in the transformer circuit so as to raise or lower the voltage applied to the gate 58 so as to cause the master rectifier 38 to conduct or not to conduct. This is accomplished by connecting the base of the transistor 76 through the conductor 82 to the middle terminal of the dual output winding having 6-volt sections 84 and 86. The opposite end of the winding 86 is connected by the conductor 88 to one terminal of the 10,000 ohm motor speed selecting variable resistance 90. The other terminal of the upper winding 84 is connected by the conductor 92 to the upper terminal of the light dependent resistance 94. The second terminals of the variable resistance 90 and the light dependent resistance 94 are connected together and to the conductor 96 which connects to the conductor 78. In this circuitry the diodes 56, 64, and 74 may be 1N–536 diodes, the transistor may be a 2N2711 transistor, while the resistor 94 may be a B–873103 light dependent resistance made by Ferrocube. The resistances 54 and 62 have a value of 47 ohms.

For the purpose of maintaining the motor 28 at a constant speed, it is provided with a small direct current generator 98 which generates a current in the winding 121. This generator 98 may generate 7 volts per 1,000 r.p.m. A variety of direct current generators may be used for this purpose. As one specific example, a 5B–740A–2 DC generator made by the Servo Tek Products Co. may be used. The terminals of the winding 121 are connected to the terminals of an incandescent lamp 123. Any suitable lamp may be used for this purpose. However, as one specific example, a G.E. No. 47 lamp may be used. This lamp illuminates the light dependent resistance 94 in proportion to the speed of the motor 28.

When the speed of the motor 28 is low, there will be no visible light emitted by the bulb 123. The radiation from the light 123 will therefore be very small and have only a small effect upon the light dependent resistance 94. Therefore the resistance of the resistance 94 will be high. This will make the base to emitter voltage positive and relatively high so as to cause the transistor 76 to conduct a relatively large amount of current. This will cause the voltage applied to the gate 58 at the beginning of each alternate half cycle to be increased above the firing point so that the master rectifier 38 will fire throughout every alternate half cycle. The slave rectifier 44 through the transformer 42 and the gate 66 will be caused to fire throughout every other or alternate half cycle. This will cause the motor to be fully energized so as to cause its speed to increase. The speed selection is made by adjusting the variable resistance 90.

As the motor 28 increases its speed, it will increase the voltage generated in the winding 121 and applied to the lamp 123. The increased current flow through the lamp 123 will increase its brightness and its illumination of the light dependent resistance 94. This will gradually reduce the positive voltage applied to the base of the transistor 76 so that the voltage applied to the gate 58 will be reduced as the speed of the motor 28 increases. As the motor 28 approaches the speed selected by the adjustment of the variable resistance 90, the voltage applied to the gate 58 will be reduced sufficiently that the master rectifier 38 will no longer conduct every half cycle but will only conduct for a few half cycles at a time. When the motor 28 reaches the selected speed, the voltage impressed upon the gate 58 will cause the master rectifier 38 and consequently the slave rectifier 44 to conduct only a proportion of half cycles sufficient to keep the motor 28 operating at the speed selected by the adjustment of the resistor 90.

While the embodiment of the present invention as herein disclosed, constitutes a preferred form, it is to be understood that other forms might be adopted.

What is claimed is as follows:

1. In combination, an electrical load, alternating current supply conductors connected to said electrical load, a voltage responsive semiconductor control means connected in series circuit with said electrical load for controlling said electrical load, means for applying a voltage to said semiconductor control means to control the conducting thereof, a lamp, means for energizing said lamp in accordance with the output of said load, and means responsive to the energization of said lamp for controlling the voltage applied to the semiconductor control means, said semiconductor control means being arranged to conduct current in one direction of current flow, a second semiconductor control means connected in parallel circuit with said first mentioned semiconductor control means and arranged to conduct current in the opposite direction, and transformer means responsive to current flow through the first mentioned semiconductor control means for applying a voltage ot the second semiconductor control means.

2. In combination, an electrical load, alternating current supply conductors connected to said electrical load, a voltage responsive semiconductor control means connected in series circuit with said electrical load for controlling said electrical load, a transformer circuit comprising a first transformer means operatively connected to one of said supply conductors and a second transformer means for applying a voltage to said semiconductor control means, a transistor connected in series with said transformer circuit, a light dependent resistor means having means for reducing the current flow through said transistor and said transformer circuit in response to an increase in light thereon, a lamp for illuminating said light dependent resistor means, and means responsive to an increase in output of said load for increasing the energization and illumination of said lamp and increasing the illumination of said light dependent resistor means for reducing the current flow in said transformer circuit.

References Cited
UNITED STATES PATENTS

| | | | |
|---|---|---|---|
| 2,262,361 | 11/1941 | Gulliksen | 318—313 |
| 3,233,163 | 2/1966 | Matsuo Mishima | 318—327 |
| 3,239,741 | 3/1966 | Rank | 318—313 |

ORIS L. RADER, *Primary Examiner.*

J. C. BERENZWEIG, J. J. BAKER,
*Assistant Examiners.*